United States Patent
Nakamura et al.

(10) Patent No.: US 11,283,527 B2
(45) Date of Patent: Mar. 22, 2022

(54) OPTICAL TRANSMITTING SYSTEM, OPTICAL TRANSMITTING APPARATUS, OPTICAL RECEIVING APPARATUS AND TRANSFER FUNCTION ESTIMATING METHOD

(71) Applicant: NIPPON TELEGRAPH AND TELEPHONE CORPORATION, Tokyo (JP)

(72) Inventors: Masanori Nakamura, Musashino (JP); Fukutaro Hamaoka, Musashino (JP); Hiroshi Yamazaki, Musashino (JP); Munehiko Nagatani, Musashino (JP); Takayuki Kobayashi, Musashino (JP); Yutaka Miyamoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/311,928

(22) PCT Filed: Dec. 4, 2019

(86) PCT No.: PCT/JP2019/047309
§ 371 (c)(1),
(2) Date: Jun. 8, 2021

(87) PCT Pub. No.: WO2020/121901
PCT Pub. Date: Jun. 18, 2020

(65) Prior Publication Data
US 2022/0029707 A1   Jan. 27, 2022

(30) Foreign Application Priority Data
Dec. 11, 2018 (JP) .............................. JP2018-231943

(51) Int. Cl.
*H04B 10/04* (2006.01)
*H04B 10/58* (2013.01)
*H04B 10/69* (2013.01)

(52) U.S. Cl.
CPC ........... *H04B 10/58* (2013.01); *H04B 10/697* (2013.01)

(58) Field of Classification Search
CPC .. H04B 10/58; H04B 10/697; H04B 10/2507; H04B 10/516; H04B 10/548; H04B 10/16971; H04J 14/02; H04J 14/06
(Continued)

(56) References Cited

U.S. PATENT DOCUMENTS

| 2013/0071119 A1* | 3/2013 | Liu ................... H04B 10/25137 398/65 |
| 2014/0029957 A1* | 1/2014 | Sethumadhavan .. H04B 10/588 398/192 |
| 2016/0105244 A1* | 4/2016 | Akiyama ......... H04B 10/50572 398/186 |

FOREIGN PATENT DOCUMENTS

JP           201842073 A    3/2018

OTHER PUBLICATIONS

Hiroshi Yamazaki et al., Digital-Preprocessed Analog-Multiplexed DAC for Ultrawideband Multilevel Transmitter, Journal of Lightwave Technology, vol. 34, No. 7, 2016, pp. 1579-1584.
(Continued)

*Primary Examiner* — Hanh Phan

(57) ABSTRACT

An optical transmission system includes an optical transmitter and an optical receiver. The optical transmitter includes a low speed signal generation unit configured to generate, based on an input signal of a transmission data sequence and a signal obtained by cyclically shifting a spectrum of the input signal, a plurality of low speed signals, a high speed signal generation unit configured to digital-to-analog convert and synthesize the plurality of low speed signals to generate a high speed signal, and an optical modulation unit configured to transmit an optical signal obtained by modulation of the high speed signal to a transmission path. The optical receiver includes a reception unit configured to receive the optical signal from the transmission path and output the high speed signal obtained from the optical signal that is received, an optical-receiver-side high speed signal compensation unit configured to compensate, based on the high speed signal output by the reception unit and a signal obtained by cyclically shifting a spectrum of the high speed signal, for the high speed signal, and a reception data decoding unit configured to decode the high
(Continued)

speed signal compensated by the optical-receiver-side high speed signal compensation unit to restore binary information included in the optical signal transmitted by the optical transmitter.

7 Claims, 13 Drawing Sheets

(58) Field of Classification Search
USPC ....... 398/183, 188, 192, 193, 194, 195, 196, 398/197, 198, 199, 202, 208, 209, 158, 398/159, 147, 81, 79, 135, 136, 162
See application file for complete search history.

(56) References Cited

OTHER PUBLICATIONS

Xi Chen et al., All-Electronic 100-GHz Bandwidth Digital-to-Analog Converter Generating PAM Signals up to 190 GBaud, Journal of Lightwave Technology, vol. 35, No. 3, 2017, pp. 411-417.
Fukutaro Hamaoka et al., Electrical spectrum synthesis technique using digital pre-processing and ultra-broadband electrical bandwidth doubler for high-speed optical transmitter, ReView by River Valley Technologies, Electronics Letters, vol. 54, No. 24, 2018.
Hiroshi Yamazaki et al., Transmission of 400-Gbps Discrete Multi-tone Signal Using > 100-GHz-Bandwidth Analog Multiplexer and InP Mach-Zehnder Modulator, Proceedings of ECOC 2018, Th3B: Post-deadline papers—Session 2, Sep. 23, 2018.

* cited by examiner

OPTICAL TRANSMITTING SYSTEM, OPTICAL TRANSMITTING APPARATUS, OPTICAL RECEIVING APPARATUS AND TRANSFER FUNCTION ESTIMATING METHOD

CROSS-REFERENCE TO RELATED APPLICATIONS

This application is a 371 U.S. National Phase of International Application No. PCT/JP2019/047309 filed on Dec. 4, 2019, which claims priority to Japanese Application No. 2018-231943 filed on Dec. 11, 2018. The entire disclosures of the above applications are incorporated herein by reference.

TECHNICAL FIELD

The present invention relates to an optical transmission system, an optical transmitter, an optical receiver, and a transfer function estimation method.

BACKGROUND ART

In trunk networks of optical communication systems, there has been a demand for an increase in a transmission capacity per channel due to a recent communication traffic increase and an increase in a line capacity accommodating client signals, including Ethernet (trade name) of 400 gigabits per second (Gbps) and 1 terabits per second (Tbps). In current systems having 100 Gbps per channel, a digital coherent optical transmission method having a modulation rate of 32 GBaud (Baud) and using dual polarization-quadrature phase shift keying (DP-QPSK) as a modulation method has been employed.

In order to increase the transmission capacity per channel, study has been conducted on improvement in the modulation rate in next generation 400 Gbps and 1 Tbps transmission. Limitations on the analog band of a digital-to-analog converter (DAC) have been a challenge in improvement in the modulation rate. As the technique of increasing the analog band of DAC, a technique that a plurality of low speed signals are synthesized in analog by using a plurality of digital to analog converters (DACs) and an analog multiplexing unit to generate a high speed signal (see, e.g., Non Patent Literatures 1 to 3). In these techniques, the signals are multiplexed in analog, and therefore, imperfectness of an analog circuit provides great influence on the quality of the generated high speed signal. For this reason, the technique of estimating/compensating for imperfectness of an optical transmitter is important.

As the technique of compensating for the imperfectness of the analog circuit as described above, techniques described in Patent Literature 1 and Non Patent Literatures have been proposed. In the technique disclosed in Patent Literature 1, in an optical transmitter or an optical receiver, a high speed signal generated by the above-described technique is reseparated into a plurality of low speed signals to estimate transfer functions for the low speed signals and transfer functions are updated using the estimated transfer functions.

In the technique disclosed in Non Patent Literature 4, a digital filter capable of simultaneously compensating for a transfer function for a low speed signal and a transfer function for a high speed signal is used.

CITATION LIST

Patent Literature

PTL 1: JP 2018-042073 A

Non Patent Literature

Non Patent Literature 1: H. Yamazaki, M. Nagatani, S. Kanazawa, H. Nosaka, T. Hashimoto, A. Sano, and Y. Miyamoto, "Digital-Preprocessed Analog-Multiplexed DAC for Ultrawideband Multilevel Transmitter", JOURNAL OF LIGHTWAVE TECHNOLOGY, VOL. 34, NO. 7, pp. 1579-1584, Apr. 1, 2016.

Non Patent Literature 2: X. Chen, S. Chandrasekhar, S. Randel, G. Raybon, A. Adamiecki, P. Pupalaikis, and P. J. Winzer, "All-Electronic 100-GHz Bandwidth Digital-to-Analog Converter Generating PAM Signals up to 190 GBaud", JOURNAL OF LIGHTWAVE TECHNOLOGY, VOL. 35, NO. 3, pp. 411-417, Feb. 1, 2017.

Non Patent Literature 3: F. Hamaoka, M. Nakamura, M. Nagatani, H. Wakita, H. Yamazaki, T. Kobayashi, H. Nosaka, and Y. Miyamoto, "Electrical spectrum synthesis technique using digital pre-processing and ultra-broadband electrical bandwidth doubler for high-speed optical transmitter", Electronics Letters, Vol. 54, issue 24, pp. 1390-1391, Nov. 29, 2018.

Non Patent Literature 4: H. Yamazaki, M. Nagatani, H. Wakita, Y. Ogiso, M. Nakamura, M. Ida, T. Hashimoto, H. Nosaka, and Y. Miyamoto, "Transmission of 400-Gbps Discrete Multi-tone Signal Using >100-GHz-Bandwidth Analog Multiplexer and InP Mach-Zehnder Modulator", Proceedings of ECOC 2018, Th3B: Post-deadline papers—Session 2, Sep. 27, 2018.

SUMMARY OF THE INVENTION

Technical Problem

However, in a case where a plurality of low speed signals are synthesized in analog to generate high speed signal by using an analog multiplexing unit as in the typical case, a crosstalk component between the low speed signals remains due to the imperfectness of an analog circuit. As a result, there is a problem that the signal quality degrades.

In view of the above-described circumstances, an object of the present invention is to provide a technique capable of improving signal quality degradation.

Means for Solving the Problem

One aspect of the present invention is an optical transmission system including an optical transmitter, and an optical receiver, in which the optical transmitter includes a low speed signal generation unit configured to generate, based on an input signal of a transmission data sequence and a first signal obtained by cyclically shifting a spectrum of the input signal, a plurality of low speed signals, a high speed signal generation unit configured to digital-to-analog convert and synthesize the plurality of low speed signals to generate a high speed signal, and an optical modulation unit configured to transmit an optical signal obtained by modulation of the high speed signal to a transmission path, and the optical receiver includes a reception unit configured to receive the optical signal from the transmission path and output the high speed signal obtained from the optical signal that is received, an optical-receiver-side high speed signal compensation unit configured to compensate, based on the high speed signal output by the reception unit and a second signal obtained by cyclically shifting a spectrum of the high speed signal, for the high speed signal, and a reception data decoding unit configured to decode the high speed signal compensated by the optical-receiver-side high speed signal compensation unit to restore binary information included in the optical signal transmitted by the optical transmitter.

One aspect of the present invention is the optical transmission system, in which the optical transmitter further includes a transmitter-side high speed signal compensation unit configured to multiply a transfer function by each of the input signal of the transmission data sequence and the first signal obtained by cyclically shifting the spectrum of the input signal and add up multiplication results to compensate for the input signal, the low speed signal generation unit generates the plurality of low speed signals from the input signal compensated by the transmitter-side high speed signal compensation unit, and the optical-receiver-side high speed signal compensation unit multiplies a transfer function by each of the high speed signal output by the reception unit and the second signal obtained by cyclically shifting the spectrum of the high speed signal and adds up multiplication results to compensate for the high speed signal.

One aspect of the present invention is the optical transmission system, in which the low speed signal generation unit multiplies a transfer function by each of the input signal of the transmission data sequence and the first signal obtained by cyclically shifting the spectrum of the input signal and adds up multiplication results to compensate for the input signal, and generates the plurality of low speed signals from the input signal that is compensated, and the optical-receiver-side high speed signal compensation unit multiplies a transfer function by each of the high speed signal output by the reception unit and the second signal obtained by cyclically shifting the spectrum of the high speed signal and adds up multiplication results to compensate for the high speed signal.

One aspect of the present invention is the optical transmission system, in which the optical receiver further includes a transfer function estimation unit configured to calculate the transfer function based on a difference between an output signal of the optical-receiver-side high speed signal compensation unit and a reference signal.

One aspect of the present invention is the optical transmission system, in which the transfer function estimation unit calculates the transfer function by using, as the reference signal, part of the transmission data sequence predefined as a known signal, or calculates the transfer function by using, as the reference signal, a value obtained by hard decision on the output of the optical-receiver-side high speed signal compensation unit.

One aspect of the present invention is an optical transmitter in an optical transmission system including the optical transmitter and an optical receiver, the optical transmitter including a low speed signal generation unit configured to generate, based on an input signal of a transmission data sequence and a signal obtained by cyclically shifting a spectrum of the input signal, a plurality of low speed signals, a high speed signal generation unit configured to digital-to-analog convert and synthesize the plurality of low speed signals to generate a high speed signal, and an optical modulation unit configured to transmit an optical signal obtained by modulation of the high speed signal to a transmission path.

One aspect of the present invention is an optical receiver in an optical transmission system including an optical transmitter and the optical receiver, the optical receiver including a reception unit configured to receive an optical signal transmitted from the optical transmitter via a transmission path and output a high speed signal obtained from the optical signal that is received, a high speed signal compensation unit configured to compensate, based on the high speed signal output by the reception unit and a signal obtained by cyclically shifting a spectrum of the high speed signal, for the high speed signal, and a reception data decoding unit configured to decode the high speed signal compensated by the optical-receiver-side high speed signal compensation unit to restore binary information included in the optical signal transmitted by the optical transmitter.

One aspect of the present invention is a transfer function estimation method in an optical transmission system including an optical transmitter and an optical receiver, the transfer function estimation method including, by the optical transmitter, generating, based on an input signal of a transmission data sequence and a first signal obtained by cyclically shifting a spectrum of the input signal, a plurality of low speed signals, by the optical transmitter, digital-to-analog converting and synthesizing the plurality of low speed signals to generate a high speed signal, by the optical transmitter, transmitting an optical signal obtained by modulation of the high speed signal to a transmission path, by the optical receiver, receiving the optical signal from the transmission path and outputting the high speed signal obtained from the optical signal that is received, by the optical receiver, compensating, based on the high speed signal that is output and a second signal obtained by cyclically shifting a spectrum of the high speed signal, for the high speed signal, and, by the optical receiver, decoding the high speed signal that is compensated to restore binary information included in the optical signal transmitted by the optical transmitter.

Effects of the Invention

The present invention allows improvement in signal quality degradation.

DESCRIPTION OF EMBODIMENTS

Embodiments of the present invention will be described below with reference to the drawings.

Figure 1:
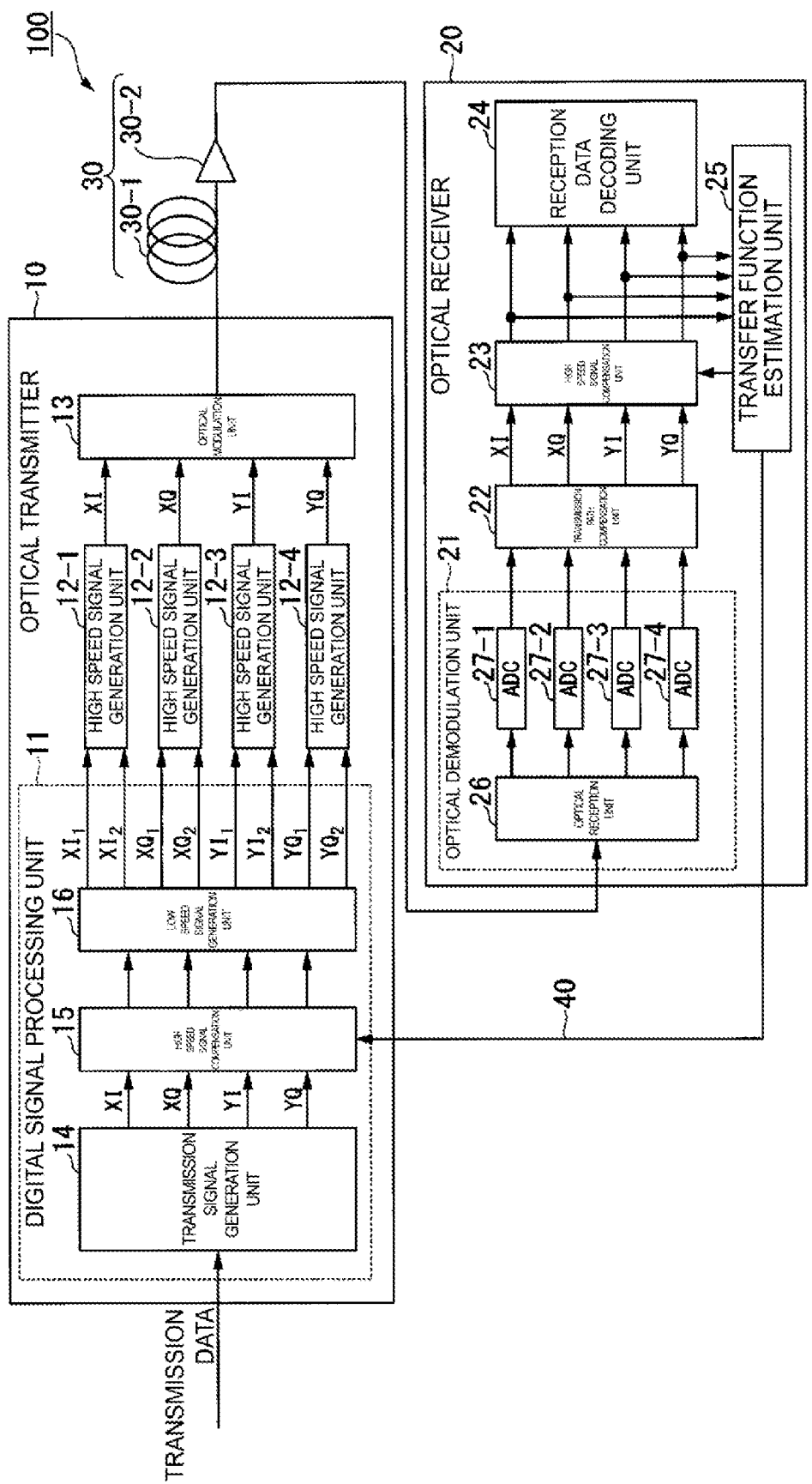
FIG. 1 is a block diagram illustrating a configuration of an optical transmission system in the present invention.

FIG. 1 is a block diagram illustrating a configuration of an optical transmission system 100 according to the present invention.

The optical transmission system 100 includes an optical transmitter 10 and an optical receiver 20. The optical transmitter 10 and the optical receiver 20 are connected via a transmission path 30. The optical transmitter 10 and the optical receiver 20 are connected via a communication line 40.

The transmission path 30 is a path that transmits an optical signal transmitted from the optical transmitter 10 to the optical receiver 20. The transmission path 30 includes an optical fiber 30-1 and an optical amplifier 30-2. The optical signal output from the optical transmitter 10 is transmitted by the optical fiber 30-1, is amplified by the optical amplifier 30-2, and is received by the optical receiver 20.

The communication line 5 is used when a transfer function calculated by the optical receiver 20 is transmitted to the optical transmitter 10. The communication line 5 is, for example, a communication channel, or a control channel of a network element operation system (NE-Ops) or a network operation system (NW-Ops).

Next, specific configurations of the optical transmitter 10 and the optical receiver 20 will be described.

The optical transmitter 10 includes a digital signal processing unit 11, a high speed signal generation unit 12, and an optical modulation unit 13. Note that in the following description, the meaning of a low speed and a high speed in terms of a low speed signal and a high speed signal indicates narrowness and broadness of the bandwidth of an analog band. For example, in a case where the bandwidth of the high speed signal is fc [GHz], the bandwidth of the low speed signal is a value smaller than fc [GHz]. In the present embodiment, the bandwidth is about the high speed signal≈the low speed signal×N (N is the number of digital-to-analog converters (DACs)).

The digital signal processing unit 11 performs digital signal processing on a transmission data sequence as binary information supplied from the outside. The digital signal processing unit 11 includes a transmission signal generation unit 14, a high speed signal compensation unit 15, and a low speed signal generation unit 16.

Figure 2:
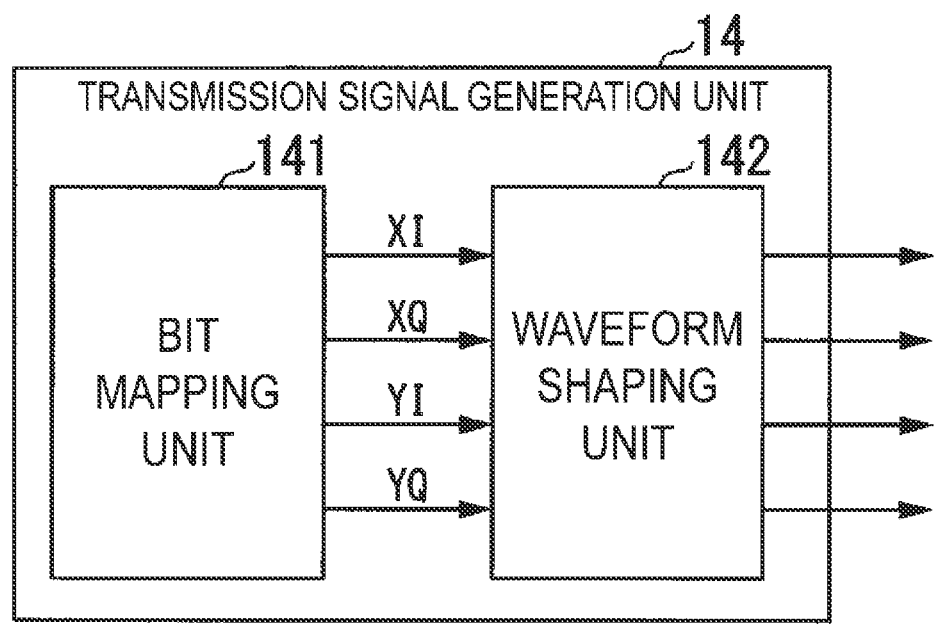
FIG. 2 is a diagram illustrating an internal configuration of a transmission signal generation unit.

The transmission signal generation unit 14 generates a modulation signal sequence (XI, XQ, YI, YQ) as a high speed signal. Specifically, the transmission signal generation unit 14 has an internal configuration illustrated in FIG. 2, and includes a bit mapping unit 141 and a waveform shaping unit 142. The bit mapping unit 141 performs, for the transmission data sequence, assignment of a transmission bit to a symbol point, such as quadrature phase shift keying (QPSK), 16 quadrature amplitude modulation (16QAM), or the like, and generates the modulation signal sequence (XI, XQ, YI, YQ) as the high speed signal.

The waveform shaping unit 142 performs filtering on each modulation signal sequence (XI, XQ, YI, YQ) output by the bit mapping unit 141. A filter such as a raised cosine filter or a root raised cosine filter is used for the filtering processing. Note that, in the waveform shaping unit 142, any signal processing for compensating for waveform distortion in the transmission path, such as wavelength dispersion pre-compensation or nonlinear optical effect pre-compensation may be performed.

The high speed signal compensation unit 15 compensates for frequency characteristics, based on the modulation signal sequence (XI, XQ, YI, YQ) with waveform shaping and the transfer function obtained from the optical receiver 20. Here, any method can be applied as the method for compensating for the frequency characteristics based on the transfer function, and includes, for example, a digital signal processing method using, e.g., a finite impulse response (FIR) filter, an infinite impulse response (IIR) filter, or an equalizer in a frequency domain by means of discrete Fourier transform, or an analog method using an analog filter such as a phase shifter or a delay line. The high speed signal compensation unit 15 compensates for the frequency characteristics for every modulation signal sequence (XI, XQ, YI, YQ) with waveform shaping. Note that in the high speed signal compensation unit 15, any signal processing for compensating the waveform distortion in the transmission path, such as wavelength dispersion pre-compensation or nonlinear optical effect pre-compensation may be performed.

Figure 3:
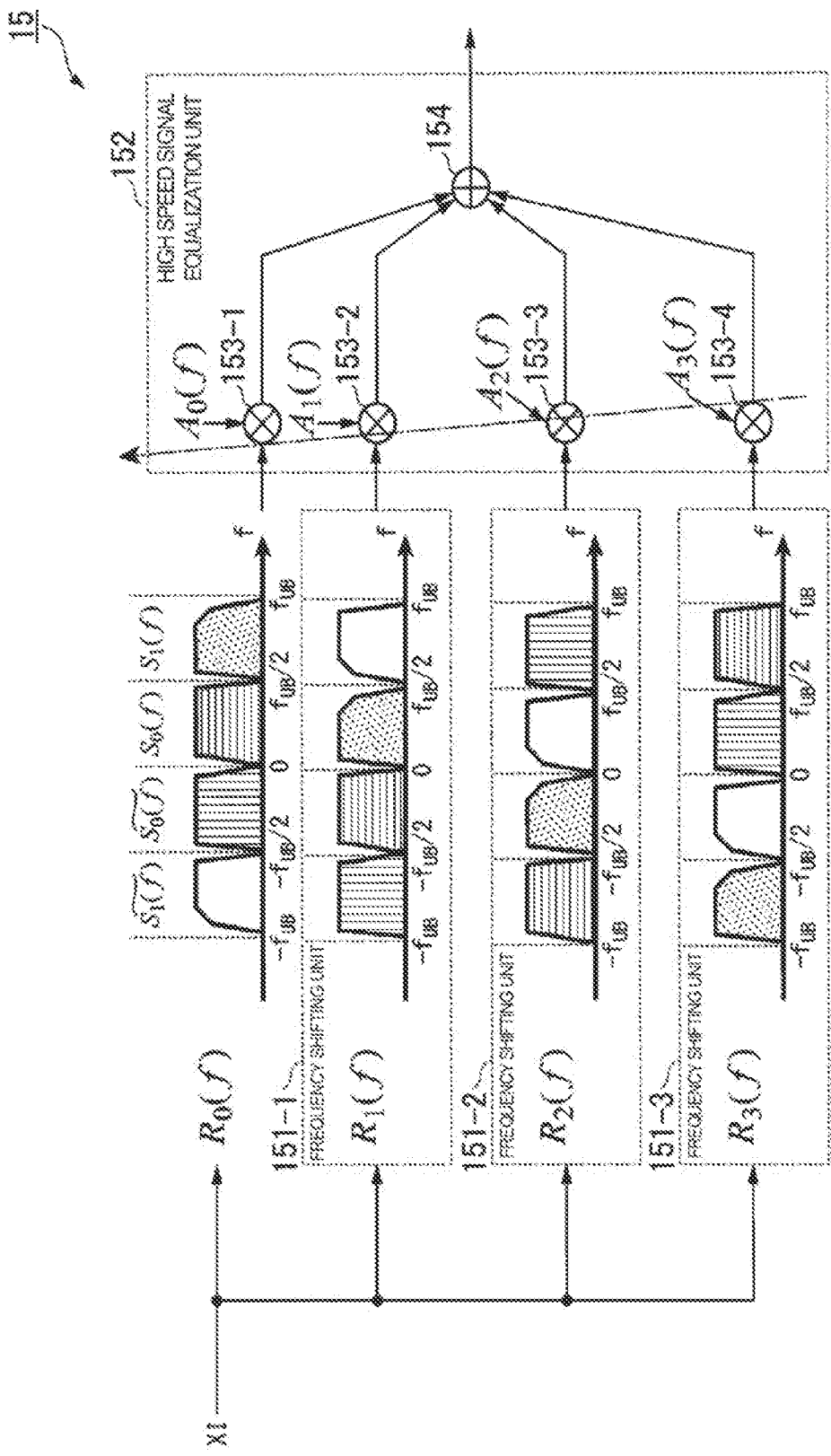
FIG. 3 is a diagram illustrating an internal configuration of a high speed signal compensation unit.

Specifically, the high speed signal compensation unit 15 has an internal configuration illustrated in FIG. 3, and includes a plurality of frequency shifting units 151-1 to 151-3 and a high speed signal equalization unit 152.

Note that in FIG. 3, a single-lane high speed signal (XI) output by the waveform shaping unit 142 is described as one example, but the high speed signal compensation unit 15 performs similar processing on each of four-lane high speed signals (XI, XQ, YI, YQ) output by the waveform shaping unit 142.

The frequency shifting units 151-1 to 151-3 cyclically shift the spectra of the input modulation signal sequences in terms of frequency. Specifically, the frequency shifting unit 151-1 shifts the spectrum of the input modulation signal sequence to the left by one. The frequency shifting unit 151-2 shifts the spectrum of the input modulation signal sequence to the left by two. The frequency shifting unit 151-3 shifts the spectrum of the input modulation signal sequence to the left by three. In a case where inter-band crosstalk occurs, compensation is allowed due to the presence of the divided spectrum in each band. Thus, the number of cyclic shifts depends on the number of divided spectra. In FIG. 3, a case where the number of divisions is N=2 is described, and the number of cyclic shifts is represented by M=N×2.

The present invention performs such processing that the divided spectra are rearranged on a frequency axis and each spectral component after division appears in all frequency bands. One method for implementing such processing is "cyclic shift" performed by the frequency shifting units 151-1 to 151-3.

As illustrated in FIG. 3, the high speed signal of the input modulation signal sequence is denoted by $R_0(f)$, the high speed signal obtained by shifting the spectrum of the high speed signal $R_0(f)$ by the frequency shifting unit 151-1 is denoted by $R_1(f)$, the high speed signal obtained by shifting the spectrum of the high speed signal $R_0(f)$ by the frequency shifting unit 151-2 is denoted by $R_2(f)$, and the high speed signal obtained by shifting the spectrum of the high speed signal $R_0(f)$ by the frequency shifting unit 151-3 is denoted by $R_3(f)$.

The high speed signal equalization unit 152 multiplies the plurality of input high speed signals ($R_0(f)$, $R_1(f)$, $R_2(f)$, and $R_3(f)$) by the transfer function ($A_0(f)$, $A_1(f)$, $A_2(f)$, and $A_3(f)$), respectively, and adds up multiplication results to compensate for the high speed signal. The high speed signal equalization unit 152 includes a plurality of multipliers 153-1 to 153-4 and an adder 154.

The multipliers 153-1 to 153-4 multiply the input high speed signals by the transfer functions. Specifically, the high speed signal $R_0(f)$ of the modulation signal sequence output from the waveform shaping unit 142 is directly input to the multiplier 153-1. The high speed signal $R_1(f)$ cyclically shifted by the frequency shifting unit 151-1 in terms of frequency is input to the multiplier 153-2. The high speed signal $R_2(f)$ cyclically shifted by the frequency shifting unit 151-2 in terms of frequency is input to the multiplier 153-3. The high speed signal $R_3(f)$ cyclically shifted by the frequency shifting unit 151-3 in terms of frequency is input to the multiplier 153-4. The transfer functions $A_0(f)$, $A_1(f)$, $A_2(f)$, $A_3(f)$ input to the multipliers 153-1 to 153-4, respectively, are calculated by the optical receiver 20.

The multiplier 153-1 multiplies the high speed signal $R_0(f)$ and the transfer function $A_0(f)$, and outputs the multiplication result to the adder 154. The multiplier 153-2 multiplies the high speed signal $R_1(f)$ and the transfer function $A_1(f)$, and outputs the multiplication result to the adder 154. The multiplier 153-3 multiplies the high speed signal $R_2(f)$ and the transfer function $A_2(f)$, and outputs the multiplication result to the adder 154.

The multiplier 153-4 multiplies the high speed signal $R_3(f)$ and the transfer function $A_3(f)$, and outputs the multiplication result to the adder 154.

The adder 154 adds up the multiplication results output from respective multipliers 153-1 to 153-4. Accordingly, a high speed signal $S(f)$ is generated. The adder 154 outputs the generated high speed signal $S(f)$ to the low speed signal generation unit 16. Note that the high speed signal $S(f)$ is represented by Equation (1) below.

[Math. 1]

$$S(f) = (A_0(f)\ A_1(f)\ A_2(f)\ A_3(f)) \begin{pmatrix} R_0(f) \\ R_1(f) \\ R_2(f) \\ R_3(f) \end{pmatrix} \quad \text{Equation (1)}$$

As described above, the high speed signal compensation unit 15 performs transfer function convolution operation on each of the input modulation signal sequences and the frequency-shifted signals of the modulation signal sequences, and outputs the signal obtained by adding up of convolution operation results to the low speed signal generation unit 16.

The low speed signal generation unit 16 decomposes the high speed signal $S(f)$ output from the high speed signal compensation unit 15 into a plurality of low speed signals, and outputs these signals to the high speed signal generation units 12-1 to 12-4. Specifically, the low speed signal generation unit 16 performs signal processing to generate the low speed signals such that desired signals are generated when the output low speed signals are synthesized by the high speed signal generation units 12-1 to 12-4. For example, as the method for generating the low speed signals, the high speed signal $S(f)$ output from the high speed signal compensation unit 15 is divided in the frequency domain, a high-frequency component is folded back, and a signal obtained by adding a low-frequency component and the high-frequency component and a signal obtained by subtracting the high-frequency component from the low-frequency component are generated as the low speed signals. Note that the method for generating the low speed signals is not limited to the method described above.

The low speed signal generation unit 16 has the function of generating the plurality of low speed signals from the high speed signal for each of four lanes of the high speed signals (XI, XQ, YI, YQ). For example, the low speed signal generation unit 16 generates a plurality of low speed signals ($XI_1$, $XI_2$) from the high speed signal (XI). For example, the low speed signal generation unit 16 generates a plurality of low speed signals ($XQ_1$, $XQ_2$) from the high speed signal (XQ). For example, the low speed signal generation unit 16 generates a plurality of low speed signals ($YI_1$, $YI_2$) from the high speed signal (YI). For example, the low speed signal generation unit 16 generates a plurality of low speed signals ($YQ_1$, $YQ_2$) from the high speed signal (YQ). The processing performed by the low speed signal generation unit 16 may be performed at the same time as compensation of the high speed signal by using the coefficients of the transfer functions $A_0$ to $A_M$ (M is an integer of 1 or greater) input to the high speed signal compensation unit 15. In other words, the high speed signal compensation unit 15 and the low speed signal generation unit 16 may be configured as one functional unit. In such a configuration, the low speed signal generation unit 16 has the function included in the high speed signal compensation unit 15. In other words, the low speed signal generation unit 16 multiplies, by the transfer function, each of the input signals of the transmission data sequences and the signals obtained by cyclically shifting the spectra of the input signals, and adds up the multiplication results to compensate for the input signals.

Figure 4:
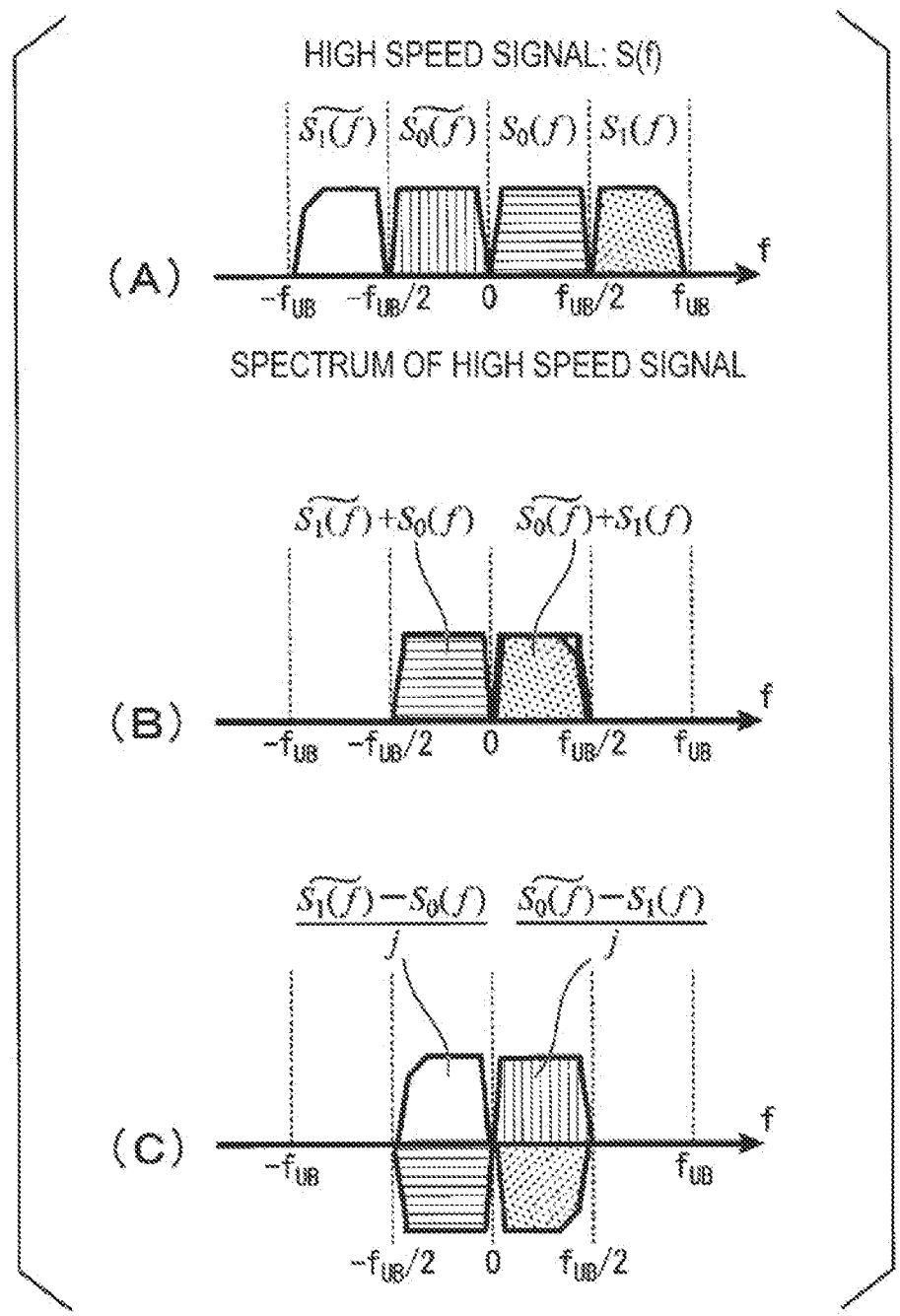
FIG. 4 is a diagram illustrating an example of generation of low speed signals in a low speed signal generation unit of the present embodiment.

FIG. 4 is a diagram illustrating an example of generation of the low speed signals in the low speed signal generation unit 16 according to the present embodiment.

FIG. 4(A) illustrates the spectrum of the high speed signal $S(f)$ input to the low speed signal generation unit 16, FIG. 4(B) illustrates the spectrum of a first low speed signal generated by the low speed signal generation unit 16, and FIG. 4(C) illustrates the spectrum of a second low speed signal generated by the low speed signal generation unit 16.

The first low speed signal is generated in such a manner that, as described above, the low speed signal generation unit 16 divides the input high speed signal $S(f)$ in the frequency domain, shifts the high-frequency component, and adds up the low-frequency component and the high-frequency component. The second low speed signal is generated in such a manner that, as described above, the low speed signal generation unit 16 divides the input high speed signal $S(f)$ in the frequency domain, shifts the high-frequency component, and subtracts the high-frequency component from the low-frequency component.

Figure 5:
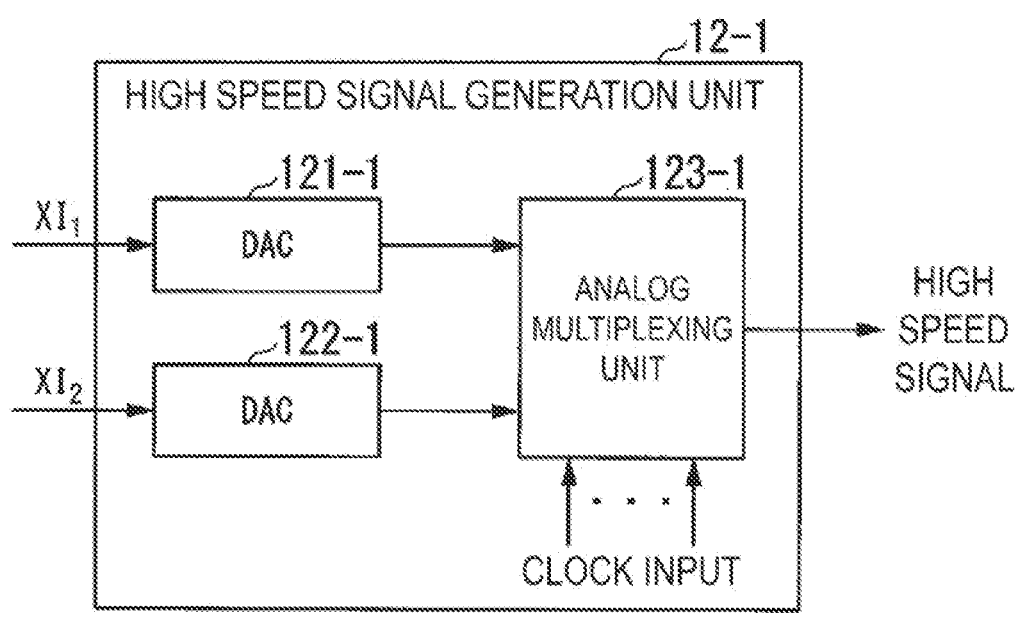
FIG. 5 is a diagram illustrating an internal configuration of a high speed signal generation unit.

The high speed signal generation units 12-1 to 12-4 have the same internal configuration, and as one example, FIG. 5 illustrates the internal configuration of the high speed signal generation unit 12-1. The high speed signal generation unit 12-1 includes two DACs 121-1 and 122-1 and an analog multiplexing unit 123-1. The DACs 121-1 and 122-1 convert the first low speed signal (XI$_1$) and the second low speed signal (XI$_2$) as digital signals into analog signals.

The analog multiplexing unit 123-1 modulates the analog signals converted by the DACs 121-1 and 122-1 by a clock with a predetermined frequency, and synthesizes the modulated analog signals to generate the high speed signal. Using two DACs 121-1 and 122-1 in this way, the band required for each of two DACs 121-1 and 122-1 can be significantly reduced as compared to a case where a high speed signal is generated by a single DAC.

Figure 6:
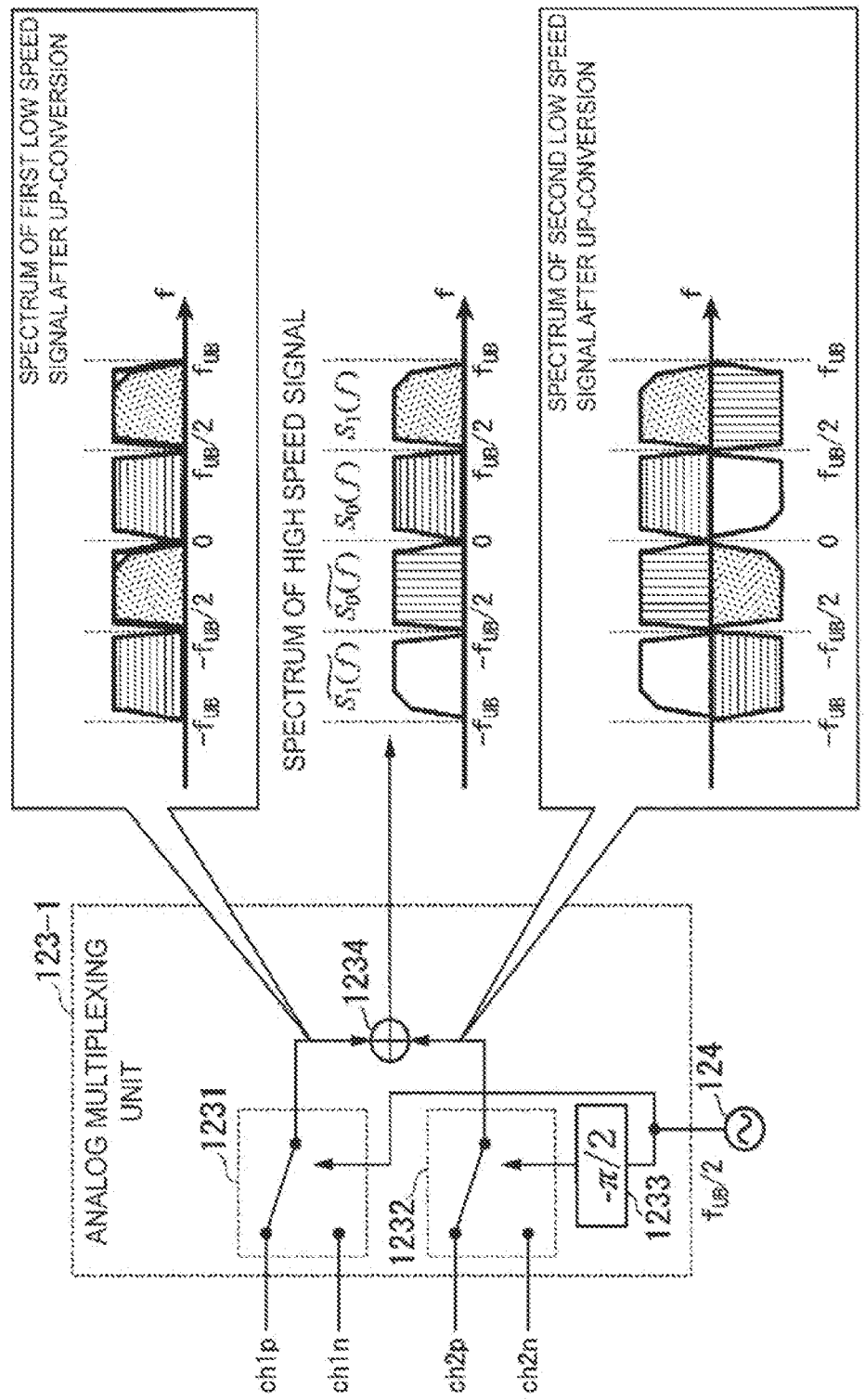
FIG. 6 is a diagram illustrating an internal configuration of an analog multiplexing unit.

FIG. 6 is a diagram illustrating an internal configuration of the analog multiplexing unit 123-1.

The analog multiplexing unit 123-1 includes a high speed switching circuit 1231, a high speed switching circuit 1232, a phase delay circuit 1233, and an adder 1234.

The high speed switching circuit 1231 has ch1p and ch1n as input terminals. The analog signal (the low speed signal) output from the DAC 121-1 is input to ch1p, and the analog signal (the low speed signal) with the polarity of the analog signal output from the DAC 121-1 inverted is input to ch1n. The analog signal input to the high speed switching circuit 1231 is modulated by the clock generated by a clock generator 124 configured to output the clock with the predetermined frequency (e.g., $f_{UB}/2$). The modulated first low speed signal is input to the adder 1234.

The high speed switching circuit 1232 has ch2p and ch2n as input terminals. The analog signal (the low speed signal) output from the DAC 122-1 is input to ch2p, and the analog signal (the low speed signal) with the polarity of the analog signal output from the DAC 122-1 inverted is input to ch2n. The analog signal input to the high speed switching circuit 1232 is modulated by the clock obtained in such a manner that a phase delay of $-\pi/2$ is provided to the clock generated by the clock generator 124. The modulated second low speed signal is input to the adder 1234.

The high speed switching circuit 1231 and the high speed switching circuit 1232 can be, as equivalent circuits, represented as multiplication of cos (wt) on a ch1 side and sin (wt) on a ch2 side.

The phase delay circuit 1233 is a circuit configured to provide a delay to the input clock. In the example illustrated in FIG. 6, the phase delay circuit 1233 provides a phase delay of $-\pi/2$ to the input clock.

The adder 1234 adds up the modulated first low speed signal output from the high speed switching circuit 1231 and the modulated second low speed signal output from the high speed switching circuit 1232. The modulated (after up-conversion) signals are added up, polarity-inverted spectral components are cancelled in the spectra of the first and second low speed signals after up-conversion, only the spectral components with the same polarity remain, and the high speed signal is reconstructed.

In a case where there is imperfectness in an analog device, cancellation as described above is incomplete, and for this reason, a crosstalk component between sub-bands remains in the reconstructed spectrum, assuming that the spectrum of the high speed signal is decomposed into four sub-bands. Even in other analog multiplexing methods (for example, Non Patent Literature 1, similar crosstalk occurs due to device imperfectness. In a case where there is a spurious (a signal present in a location out of a desired clock frequency) in the high speed switching circuits 1231, 1232, the low speed signal is modulated into an unintended band, and the crosstalk occurs between the sub-bands. In the present invention, the crosstalk between the sub-bands is compensated by the digital signal processing. In a case where there is no spurious and there is crosstalk due to imperfectness of other devices, the required number of cyclic shifts is M. In a case where the spurious is present, addition of the signal cyclically shifted by the frequency of the spurious to the high speed signal compensation unit 15 can compensate for the crosstalk between the sub-bands due to the spurious. In this case, the required number of cyclic shifts is greater than M.

The optical modulation unit 13 modulates the high speed signal into the optical signal. The optical modulation unit 13 is a polarization multiplexing IQ modulator including a polarization multiplexing Mach-Zehnder vector modulator, a driver amplifier, and a laser module. In the optical modulation unit 13, the driver amplifier installed on each lane amplifies the four-lane high speed signals (XI, XQ, YI, YQ) output by the high speed signal generation units 12-1 to 12-4. The driver amplifiers output the amplified high speed signals as modulation signals to the polarization multiplexing Mach-Zehnder vector modulator. The polarization multiplexing Mach-Zehnder vector modulator modulates the optical signal from the laser module based on the modulation signals, and outputs the modulated optical signal to the transmission path 30.

Next, a configuration of the optical receiver 20 will be described.

The optical receiver 20 includes an optical demodulation unit 21, a transmission path compensation unit 22, a high speed signal compensation unit 23, a reception data decoding unit 24, and a transfer function estimation unit 25. The optical demodulation unit 21 demodulates the optical signal transmitted from the optical transmitter 10. The optical demodulation unit 21 includes an optical reception unit 26 and a plurality of ADCs 27-1 to 27-4.

The optical reception unit 26 has a laser module therein, and converts the optical signal received via the transmission path 30 into a baseband signal by local light from the laser module and outputs the baseband signal as an electrical signal. Note that the optical reception unit 26 may output the optical signal received via the transmission path 30 as the electrical signal by direct detection. The ADCs 27-1 to 27-4 convert analog electrical signals into digital electrical signals, and output the digital electrical signals.

The transmission path compensation unit 22 compensates for waveform degradation due to wavelength dispersion, polarization fluctuation, and a nonlinear optical effect caused on the transmission path 30.

The high speed signal compensation unit 23 compensates for the frequency characteristic based on the electrical signals compensated by the transmission path compensation unit 22 and the transfer function obtained from the transfer function estimation unit 25. The high speed signal compensation unit 23 has a configuration similar to that of the high speed signal compensation unit 15.

Figure 7:
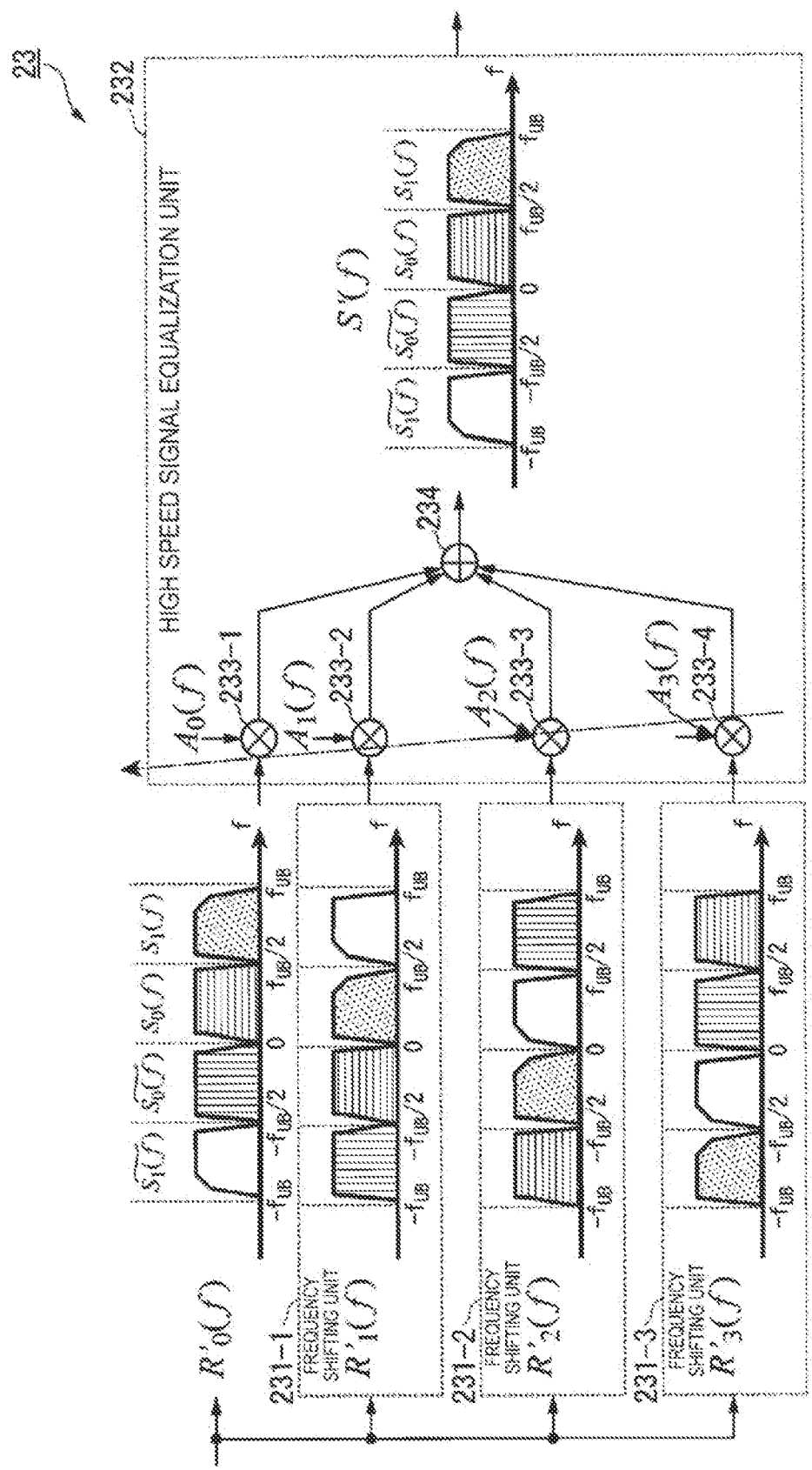
FIG. 7 is a diagram illustrating the internal configuration of the high speed signal compensation unit.

Specifically, the high speed signal compensation unit 23 has an internal configuration illustrated in FIG. 7, and includes a plurality of frequency shifting units 231-1 to 231-3 and a high speed signal equalization unit 232.

Note that in FIG. 7, the single-lane high speed signal (XI) output by the transmission path compensation unit 22 is described as one example, but the high speed signal compensation unit 23 performs similar processing for each of the four-lane high speed signals (XI, XQ, YI, YQ) output by the transmission path compensation unit 22.

The frequency shifting units 231-1 to 231-3 cyclically shift the spectra of the input modulation signal sequences in terms of frequency. Specifically, the frequency shifting unit 231-1 shifts the spectrum of the input modulation signal sequence to the left by one. The frequency shifting unit 231-2 shifts the spectrum of the input modulation signal sequence to the left by two. The frequency shifting unit 231-3 shifts the spectrum of the input modulation signal sequence to the left by three.

As illustrated in FIG. 7, the high speed signal of the input modulation signal sequence is denoted by $R'_0(f)$, the high speed signal obtained by shifting the spectrum of the high speed signal $R'_0(f)$ by the frequency shifting unit 231-1 is denoted by $R'_1(f)$, the high speed signal obtained by shifting the spectrum of the high speed signal $R'_0(f)$ by the frequency shifting unit 231-2 is denoted by $R'_2(f)$, and the high speed signal obtained by shifting the spectrum of the high speed signal $R'_0(f)$ by the frequency shifting unit 151-3 is denoted by $R'_3(f)$.

The high speed signal equalization unit 232 multiplies the plurality of input high speed signals ($R'_0(f)$, $R'_1(f)$, $R'_2(f)$, and $R'_3(f)$) by the transfer function ($A_0(f)$, $A_1(f)$, $A_2(f)$, and $A_3(f)$), respectively, and adds up multiplication results to compensate for the high speed signal. The high speed signal equalization unit 232 includes a plurality of multipliers 233-1 to 233-4 and an adder 234.

The multipliers 233-1 to 233-4 multiply the input high speed signals by the transfer functions.

Specifically, the high speed signal $R'_0(f)$ output from the transmission path compensation unit 22 is directly input into the multiplier 233-1, the high speed signal $R'i(f)$ cyclically shifted by the frequency shifting unit 231-1 in terms of frequency is input to the multiplier 233-2, the high speed signal $R'_2(f)$ cyclically shifted by the frequency shifting unit 231-2 in terms of frequency is input to the multiplier 233-3, and the high speed signal $R'_3(f)$ cyclically shifted by the frequency shifting unit 231-3 in terms of frequency is input to the multiplier 233-4. The transfer functions $A_0(f)$, $A_1(f)$, $A_2(f)$, and $A_3(f)$ input to the multipliers 233-1 to 233-4 are calculated by the optical receiver 20.

The multiplier 233-1 multiplies the high speed signal $R'_0(f)$ and the transfer function $A_0(f)$, and outputs the multiplication result to the adder 234. The multiplier 233-2 multiplies the high speed signal $R'_1(f)$ and the transfer function $A_1(f)$, and outputs the multiplication result to the adder 234. The multiplier 233-3 multiplies the high speed signal $R'_2(f)$ and the transfer function $A_2(f)$, and outputs the multiplication result to the adder 234. The multiplier 233-4 multiplies the high speed signal $R'_3(f)$ and the transfer function $A_3(f)$, and outputs the multiplication result to the adder 234.

The adder 234 adds up the multiplication results output from respective multipliers 233-1 to 233-4. Accordingly, a high speed signal S'(f) is generated. The adder 234 outputs the generated high speed signal S'(f) to the reception data decoding unit 24 and the transfer function estimation unit 25. Note that the high speed signal S'(f) is represented by Equation (2) below.

[Math. 2]

$$S'(f) = (A_0(f) \; A_1(f) \; A_2(f) \; A_3(f)) \begin{pmatrix} R'_0(f) \\ R'_1(f) \\ R'_2(f) \\ R'_3(f) \end{pmatrix} \quad \text{Equation (2)}$$

The reception data decoding unit 24 decodes an error correction code on the high speed signals (XI, XQ, YI, YQ) output by the high speed signal compensation unit 23, and restores the binary information transmitted by the optical transmitter 10.

The transfer function estimation unit 25 calculates the transfer functions used in the high speed signal compensation unit 15 and the high speed signal compensation unit 23 based on an error between the output from the high speed signal compensation unit 23 and a reference signal. Specifically, the transfer function estimation unit 25 calculates a frequency response by synchronizing the output from the high speed signal compensation unit 23 and the reference signal. Here, examples of the method for calculating the frequency response include methods utilizing application filters using a least mean square (LMS) algorithm and a recursive least square (RLS) algorithm for optimizing tap coefficients of a digital filter to minimize an error between the high speed signal output from the high speed signal compensation unit 23 and the reference signal. As methods other than these methods, a zero-forcing (ZF) method, a minimum mean square error (MMSE) method, and the like may be applied. As the reference signal, a known signal included in the transmission signal sequence or a value obtained by hard decision on the output of the high speed signal compensation unit 23 may be used.

The transfer function estimation unit 25 calculates the transfer function for each of the four lanes of the high speed signals (XI, XQ, YI, YQ).

Figure 8:
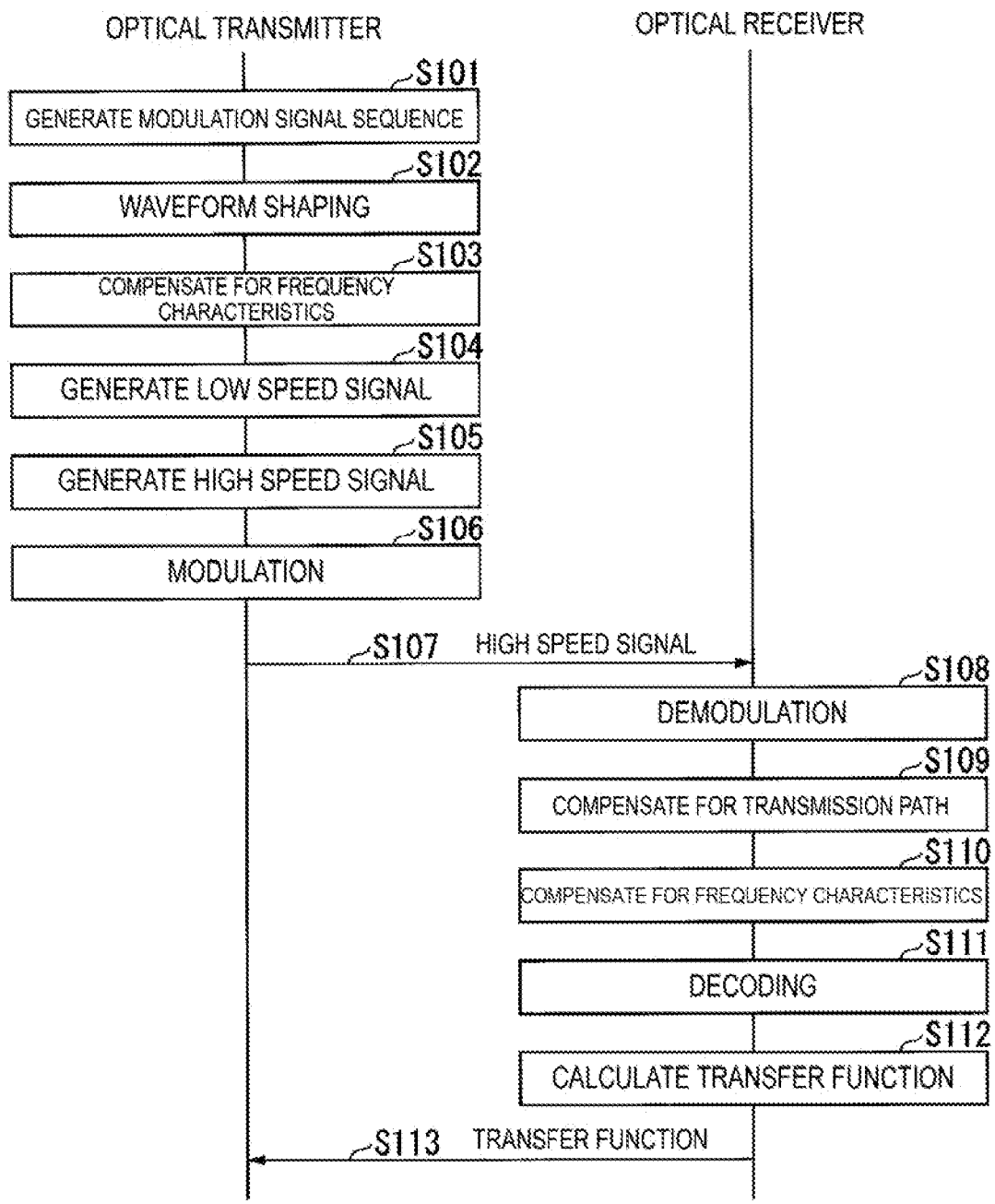
FIG. 8 is a sequence diagram illustrating the flow of processing of the optical transmission system.

FIG. 8 is a sequence diagram illustrating the flow of processing of the optical transmission system 100.

The transmission signal generation unit 14 modulates the transmission data sequence as the binary information supplied from the outside to generate the modulation signal sequence as the high speed signal (Step S101). The transmission signal generation unit 14 performs the filtering processing on the generated modulation signal sequence to perform the waveform shaping (Step S102). The transmission signal generation unit 14 outputs the modulation signal sequence with waveform shaping to the high speed signal compensation unit 15.

The high speed signal compensation unit 15 compensates for the frequency characteristics based on the modulation signal sequence output from the transmission signal generation unit 14 and the transfer function obtained from the optical receiver 20 (Step S103). The high speed signal compensation unit 15 outputs the modulation signal sequence after compensation for the frequency characteristics to the low speed signal generation unit 16. The low speed signal generation unit 16 generates, for each lane, the plurality of low speed signals (the first low speed signal and the second low speed signal) from the high speed signal as the modulation signal sequence output from the high speed signal compensation unit 15 (Step S104).

The low speed signal generation unit 16 outputs the first low speed signal ($XI_1$) and the second low speed signal ($XI_2$) generated from the modulation signal sequence (XI) to the high speed signal generation unit 12-1. The low speed signal generation unit 16 outputs the first low speed signal ($XQ_1$) and the second low speed signal ($XQ_2$) generated from the modulation signal sequence (XQ) to the high speed signal generation unit 12-2. The low speed signal generation unit 16 outputs the first low speed signal ($YI_1$) and the second low speed signal ($YI_2$) generated from the modulation signal sequence (YI) to the high speed signal generation unit 12-3. The low speed signal generation unit 16 outputs the first low speed signal ($YQ_1$) and the second low speed signal ($YQ_2$) generated from the modulation signal sequence (YQ) to the high speed signal generation unit 12-4.

The high speed signal generation unit 12-1 converts the first low speed signal ($XI_1$) and the second low speed signal ($XI_2$) output from the low speed signal generation unit 16 from the digital signals to the analog signals, and generates the high speed signal by synthesizing the analog signals (Step S105). The high speed signal generation unit 12-2 converts the first low speed signal ($XQ_1$) and the second low speed signal ($XQ_2$) output from the low speed signal generation unit 16 from the digital signals to the analog signals, and generates the high speed signal by synthesizing the analog signals. The high speed signal generation unit 12-3 converts the first low speed signal ($YI_1$) and the second low speed signal ($YI_2$) output from the low speed signal generation unit 16 from the digital signals to the analog signals, and generates the high speed signal by synthesizing the analog signals. The high speed signal generation unit 12-4 converts the first low speed signal ($YQ_1$) and the second low speed signal ($YQ_2$) output from the low speed signal generation unit 16 from the digital signals to the analog signals, and generates the high speed signal by synthesizing the analog signals. The high speed signal generation units 12-1 to 12-4 output the generated high speed signals to the optical modulation unit 13.

The optical modulation unit 13 modulates the input high speed signals into the optical signals (Step S106). The optical modulation unit 13 transmits the modulated high speed signals to the optical receiver 20 via the transmission path 30 (Step S107).

The optical demodulation unit 21 of the optical receiver 20 demodulates the optical signals transmitted from the optical transmitter 10 (Step S108). The optical demodulation unit 21 outputs the demodulated electrical signals to the transmission path compensation unit 22. The transmission path compensation unit 22 compensates for the waveform degradation due to the wavelength dispersion, the polarization fluctuation, and the nonlinear optical effect caused in the transmission path 30 (Step S109).

The high speed signal compensation unit 23 compensates for the frequency characteristics based on the signals output from the transmission path compensation unit 22 and the transfer functions obtained from the transfer function estimation unit 25 (Step S110). The high speed signal compensation unit 23 outputs the high speed signal after compensation for the frequency characteristics to the reception data decoding unit 24 and the transfer function estimation unit 25. The reception data decoding unit 24 decodes the error correction code for the high speed signal output by the high speed signal compensation unit 23, and restores the binary information transmitted by the optical transmitter 10 (Step S111).

The transfer function estimation unit 25 calculates the transfer functions used in the high speed signal compensation unit 15 and the high speed signal compensation unit 23, based on the error between each of the outputs from the high speed signal compensation unit 23 and the reference signal (Step S112). The transfer function estimation unit 25 outputs the calculated transfer functions to the high speed signal compensation unit 15 and the high speed signal compensation unit 23. For example, the transfer function estimation unit 25 transmits the calculated transfer functions to the high speed signal compensation unit 15 of the optical transmitter 10 via the communication line 40 (Step S113). Thus, in the high speed signal compensation unit 15 and the high speed signal compensation unit 23, the high speed signal is compensated using the newly-obtained transfer functions.

Figure 9:
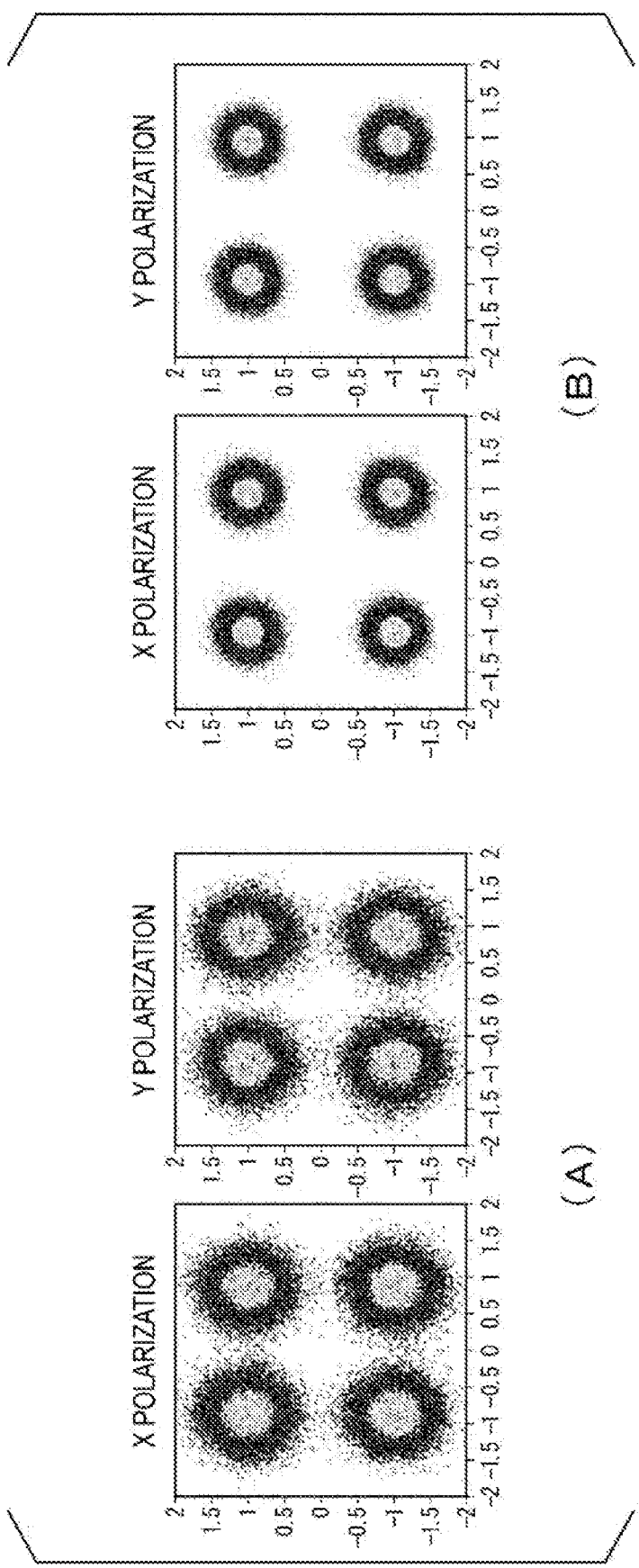
FIG. 9 is a diagram for describing effects obtained according to the present invention.

FIG. 9 is a diagram for describing effects obtained according to the present invention. FIG. 9 illustrates experimental results before and after application of the technique of the present invention to polarization multiplexing 120 GBd-QPSK. FIG. 9(A) is a diagram illustrating the experimental results before application of the technique of the present invention to polarization multiplexing 120 GBd-QPSK, and FIG. 9(B) is a diagram illustrating the experimental results after application of the technique of the present invention.

As illustrated in FIGS. 9(A) and 9(B), it can be seen that influence of interference has been clearly reduced after application of the technique of the present invention as compared to before application of the technique of the present invention.

Thus, in the present invention, the crosstalk component between the sub-bands due to the device imperfectness can be removed.

According to the optical transmission system 100 configured as described above, the transfer function estimation unit 25 calculates the transfer functions by using the high speed signals output by the high speed signal compensation unit 23 and the reference signal. The high speed signal compensation unit 15 performs the operation of compensating, in advance, for the high speed signals (XI, XQ, YI, YQ) output by the transmission signal generation unit 14, based on the calculated transfer functions. The high speed signal compensation unit 23 performs the operation of compensating for the high speed signals (XI, XQ, YI, YQ) output by the transmission signal generation unit 14, based on the calculated transfer functions. With this configuration, the transfer functions that compensate for a frequency characteristic difference among the low speed signals or the high speed signals generated in the high speed signal generation units 12-1 to 12-4 and the optical modulation unit 13 of the optical transmitter 10 and the analog device imperfectness can be calculated. Thus, compensation using the calculated transfer functions is performed so that signal quality degradation can be improved.

In the optical transmission system 100, the divided spectra are rearranged by the frequency shifting units 151-1 to 151-3 in the high speed signal compensation unit 15 and the frequency shifting units 231-1 to 231-3 in the high speed signal compensation unit 23. With this configuration, the crosstalk component between the bands due to the device imperfectness or the like can be recovered.

Modification Example

The present embodiment is directed to the polarization multiplexing signal, but may be directed to a single polarization signal. The configuration of the above-described embodiment is directed to the IQ modulation signal, but may be directed to an intensity modulation signal, and in this case, not the above-described polarization multiplexing Mach-Zehnder vector modulator but one of an intensity modulator type or one using a direct modulation optical source as a laser module is applied as the optical modulation unit 13.

In the present embodiment, the symbol points of QPSK and 16QAM are applied as symbol points to be assigned by the bit mapping unit 141, but modulation formats other than above may be applied.

In a case where the spurious is present at the clock of the analog multiplexing unit 123, addition of the frequency shifting unit 151 to the configuration of FIG. 3 according to the spurious frequency can also compensate for the crosstalk between the sub-bands due to the spurious.

In the present embodiment, the case where the technique of the present invention is applied to the analog multiplexing method (analogue multiplexer (AMUX)) described in Non Patent Literature 3 has been described in one example, but the present invention is not limited to above. For example, the technique of the present invention may be applied to the analog multiplexing method (the band doubler (type 1)) described in Non Patent Literature 1, or may be applied to the analog multiplexing method (the band doubler (type 2)) described in Non Patent Literature 4. Hereinafter, configurations in cases where the technique of the present invention is applied to other analog multiplexing methods will be specifically described.

First, using FIGS. 10 and 11, the case where the technique of the present invention is applied to the analog multiplexing method (the band doubler (type 1)) described in Non Patent Literature 1 will be described.

Figure 10:
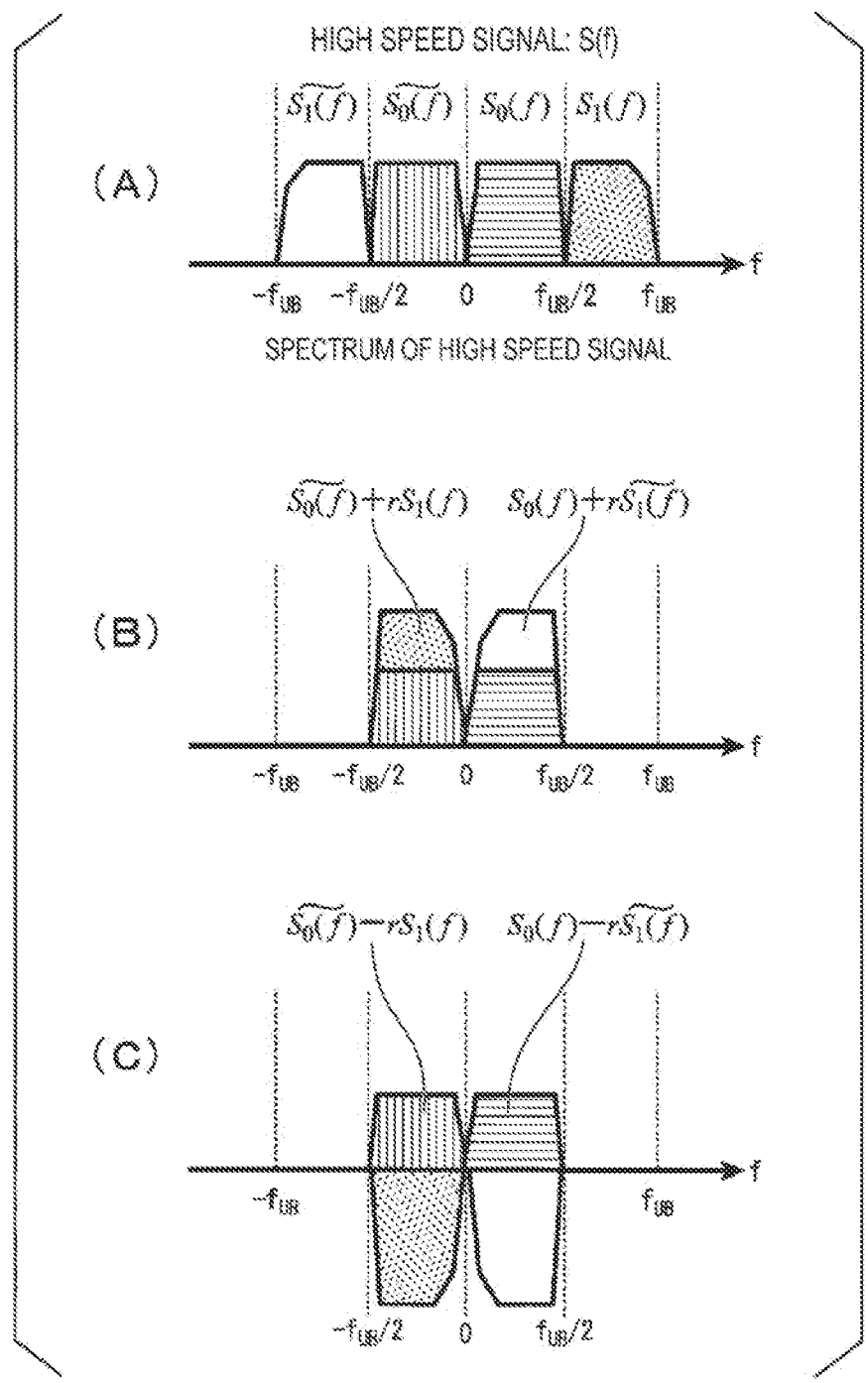
FIG. 10 is a diagram illustrating an example of generation of the low speed signals in the low speed signal generation unit in a case where the technique of the present invention is applied to an analog multiplexing method described in Non Patent Literature 1.

FIG. 10 is a diagram illustrating an example of generation of the low speed signals in the low speed signal generation unit 16 in a case where the technique of the present invention is applied to the analog multiplexing method described in Non Patent Literature 1.

FIG. 10(A) illustrates the spectra of the high speed signal S(f) input to the low speed signal generation unit 16, FIG. 10(B) illustrates the spectra of the first low speed signal generated by the low speed signal generation unit 16, and FIG. 10(C) illustrates the spectra of the second low speed signal generated by the low speed signal generation unit 16. The low speed signal generation unit 16 generates the first low speed signal obtained by addition after shifting of the spectra of the high speed signal in terms of frequency and the second low speed signal obtained by subtraction after shifting of the spectra of the high speed signal in terms of frequency.

Figure 11:
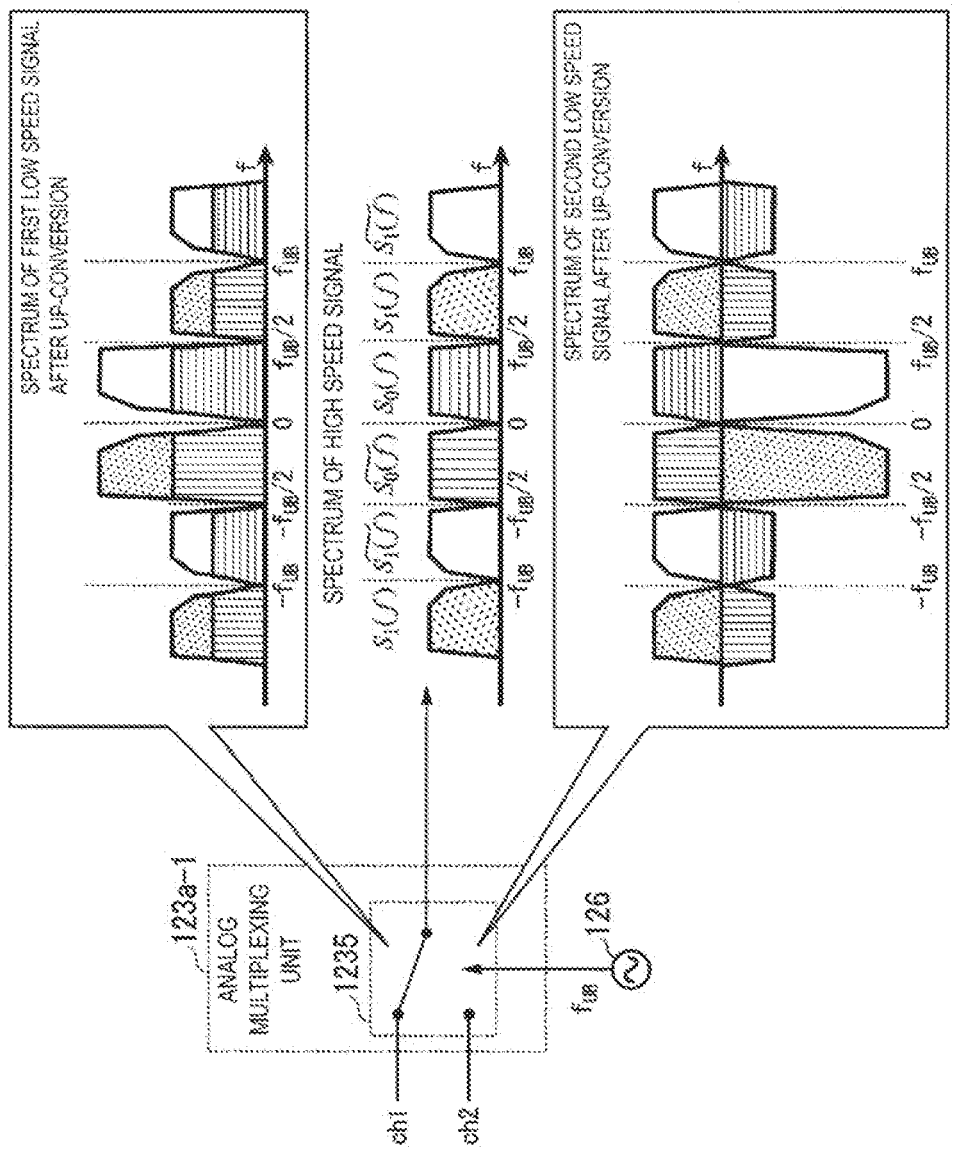
FIG. 11 is a diagram illustrating the internal configuration of the analog multiplexing unit in a case where the technique of the present invention is applied to the analog multiplexing method described in Non Patent Literature 1.

The configuration of the analog multiplexing unit 123-1 in the high speed signal generation unit 12-1 is different from the analog multiplexing unit 123-1 of FIG. 6 as illustrated in FIG. 11. FIG. 11 is a diagram illustrating an internal configuration of the analog multiplexing unit 123a-1 in a case where the technique of the present invention is applied to the analog multiplexing method described in Non Patent Literature 1. Note that in FIG. 11, the configuration of the analog multiplexing unit 123a-1 is described in one example, but the analog multiplexing units 123a-2 to 123a-4 also have similar configurations.

The analog multiplexing unit 123a-1 includes a high speed switching circuit 1235. The high speed switching circuit 1235 includes ch1 and ch2 as input terminals. The analog signal (the low speed signal) output from the DAC 121-1 is input to ch1, and the analog signal (the low speed signal) output from the DAC 122-1 is input to ch2. The analog signal input to the high speed switching circuit 1235 is modulated by a clock generated by a clock generator 126 configured to output the clock with a predetermined frequency (e.g., $f_{UB}$). The high speed switching circuit 1235 can be, as an equivalent circuit, represented as multiplication of 1+1/r×cos (wt) on a ch1 side and 1−1/r×cos (wt) on a ch2 side.

The modulated (after up-conversion) signals are added up, the polarity-inverted spectral components are cancelled in the spectra of the first and second low speed signals after up-conversion, only the spectral components with the same polarity remain, and the high speed signal is reconstructed.

The out-of-band spectrum generated after synthesis may be removed by an electrical or optical analog filter. In a case where there is the device imperfectness, cancellation as described above is incomplete, and for this reason, the crosstalk component between the sub-bands remains in the reconstructed spectrum, assuming that the spectrum of the high speed signal is decomposed into four sub-bands. In the present invention, the crosstalk between the sub-bands is removed by rearrangement of the divided spectra in the high speed signal compensation unit 15 and the high speed signal compensation unit 23.

Next, with reference to FIGS. 12 and 13, the case where the technique of the present invention is applied to the analog multiplexing method (the band doubler (type 2)) described in Non Patent Literature 4 will be described.

Figure 12:
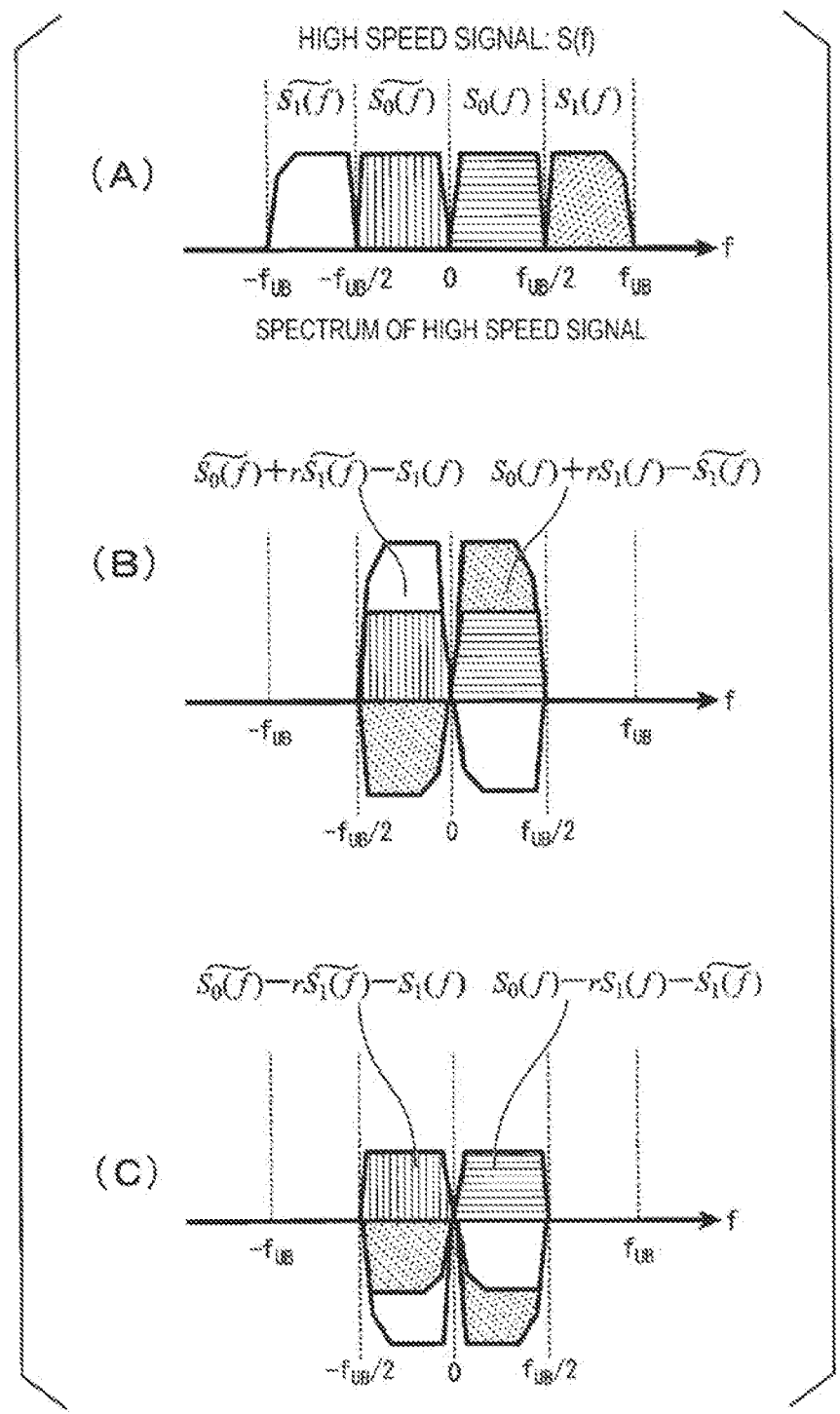
FIG. 12 is a diagram illustrating an example of generation of the low speed signals in the low speed signal generation unit in a case where the technique of the present invention is applied to an analog multiplexing method described in Non Patent Literature 4.

FIG. 12 is a diagram illustrating an example of generation of the low speed signals in the low speed signal generation unit 16 in a case where the technique of the present invention is applied to the analog multiplexing method described in Non Patent Literature 4.

FIG. 12(A) illustrates the spectra of the high speed signal S(f) input to the low speed signal generation unit 16, FIG. 12(B) illustrates the spectra of the first low speed signal generated by the low speed signal generation unit 16, and FIG. 12(C) illustrates the spectra of the second low speed signal generated by the low speed signal generation unit 16. The low speed signal generation unit 16 generates the first low speed signal obtained by addition after shifting of the spectra of the high speed signal in terms of frequency and the second low speed signal obtained by subtraction after shifting of the spectra of the high speed signal in terms of frequency.

Figure 13:
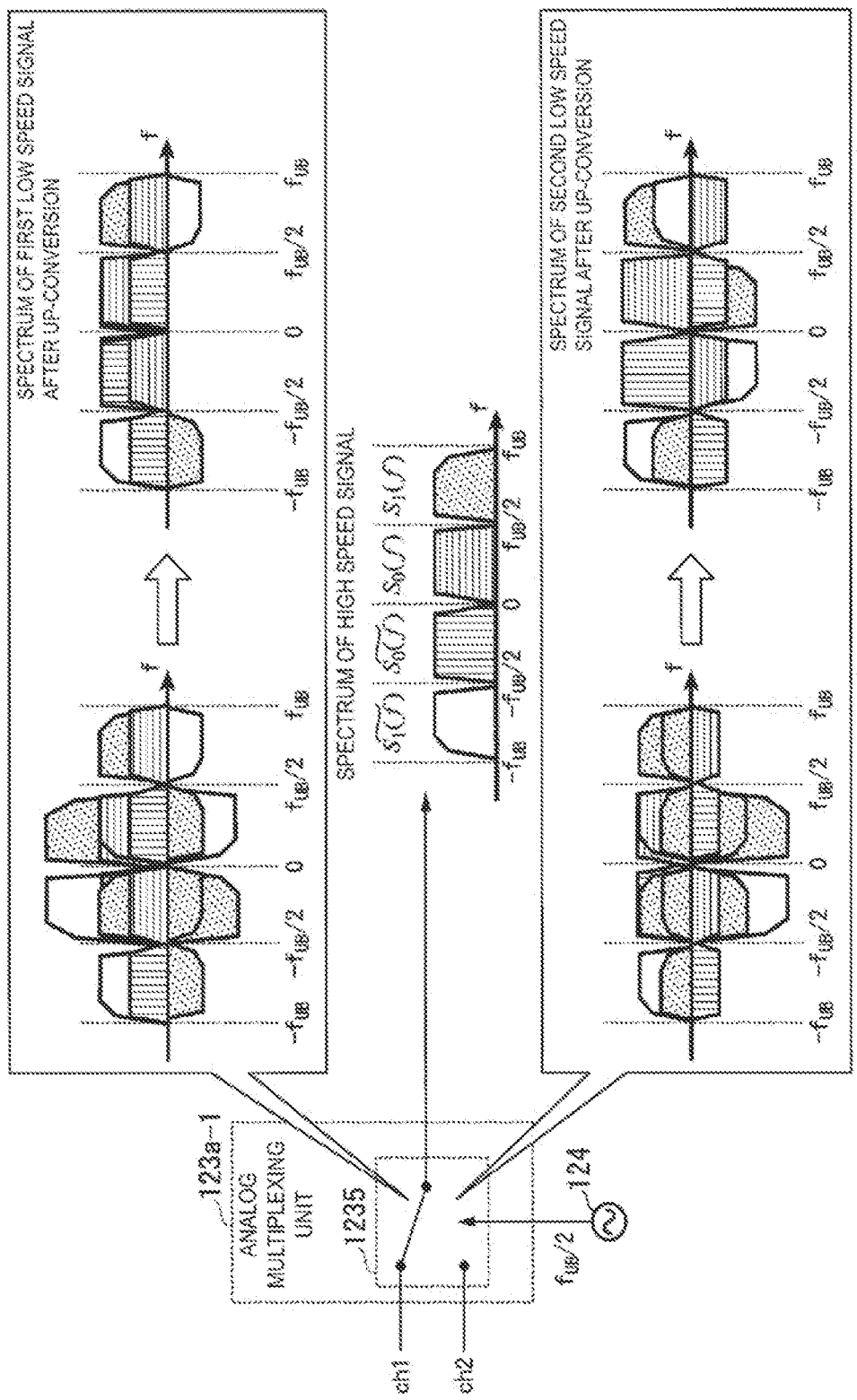
FIG. 13 is a diagram illustrating the internal configuration of the analog multiplexing unit in a case where the technique of the present invention is applied to the analog multiplexing method described in Non Patent Literature 4.

The configuration of the analog multiplexing unit 123-1 in the high speed signal generation unit 12-1 is different from the analog multiplexing unit 123-1 of FIG. 6 as illustrated in FIG. 13. FIG. 13 is a diagram illustrating an internal configuration of the analog multiplexing unit 123a-1 in a case where the technique of the present invention is applied to the analog multiplexing method described in Non Patent Literature 4. Note that in FIG. 13, the configuration of the analog multiplexing unit 123a-1 is described in one example, but the analog multiplexing units 123a-2 to 123a-4 also have similar configurations.

The internal configuration of the analog multiplexing unit 123a-1 is similar to that of the analog multiplexing unit 123a-1 illustrated in FIG. 11. A difference from the analog multiplexing unit 123a-1 illustrated in FIG. 11 is that the analog signal input to the high speed switching circuit 1235 is the clock generated by the clock generator 124 configured to output the clock with the predetermined frequency (e.g., $f_{UB}/2$). In other words, the analog signal input to the high speed switching circuit 1235 is modulated by the clock generated by the clock generator 124 configured to output the clock with the predetermined frequency (e.g., $f_{UB}/2$). The high speed switching circuit 1235 can be, as an equivalent circuit, represented as multiplication of 1+1/r×cos (wt) on the ch1 side and 1−1/r×cos (wt) on the ch2 side.

The modulated (after up-conversion) signals are added up, polarity-inverted spectral components are cancelled in the spectra of the first and second low speed signals after up-conversion, only the spectral components with the same polarity remain, and the high speed signal is reconstructed.

The out-of-band spectrum generated after synthesis may be removed by the electrical or optical analog filter. In a case where there is the device imperfectness, cancellation as described above is incomplete, and for this reason, the crosstalk component between the sub-bands remains in the reconstructed spectrum, assuming that the spectrum of the high speed signal is decomposed into four sub-bands. In the present invention, the crosstalk between the sub-bands is removed by rearrangement of the divided spectra in the high speed signal compensation unit 15 and the high speed signal compensation unit 23.

The optical transmitter 10 and the optical receiver 20 described above may be implemented by a computer.

In such a case, it may be achieved by recording a program for implementing these functions in a computer-readable recording medium, causing a computer system to read the program recorded in the recording medium, and executing the program. Note that the "computer system" as used herein includes an OS and hardware such as a peripheral device. The "computer-readable recording medium" refers to a portable medium such as a flexible disk, a magneto-optical disk, a ROM, and a CD-ROM, and a storage apparatus such as a hard disk installed in a computer system.

Further, the "computer-readable recording medium" may also include such a medium that stores programs dynamically for a short period of time, one example of which is a communication line used when a program is transmitted via a network such as the Internet and a communication line such as a telephone line, and may also include such a medium that stores programs for a certain period of time, one example of which is volatile memory inside a computer system that functions as a server or a client in the above-described case. Furthermore, the above program may be a program for implementing a part of the above-mentioned functions. The above program may be a program capable of implementing the above-mentioned functions in combination with another program already recorded in a computer system. The above program may be a program to be implemented with the use of a programmable logic device such as a field programmable gate array (FPGA).

The embodiments of the present invention have been described above in detail with reference to the drawings. However, specific configurations are not limited to those embodiments, and include any design or the like within the scope not departing from the gist of the present invention.

REFERENCE SIGNS LIST

10 Optical transmitter
20 Optical receiver
11 Digital signal processing unit
12-1 to 12-4 High speed signal generation unit
121 DAC
122 DAC
123-1 to 123-4, 123a-1 to 123a-4 Analog multiplexing unit
1231, 1232, 1235 High speed switching circuit
1233 Phase delay circuit
1234 Adder
13 Optical modulation unit
14 Transmission signal generation unit
141 Bit mapping unit
142 Waveform shaping unit
15 High speed signal compensation unit
151-1 to 151-3 Frequency shifting unit
152 High speed signal equalization unit
153-1 to 153-4 Multiplier
154 Adder
16 Low speed signal generation unit
21 Optical demodulation unit
22 Transmission path compensation unit
23 High speed signal compensation unit
231-1 to 231-3 Frequency shifting unit
232 High speed signal equalization unit
233-1 to 233-4 Multiplier
234 Adder
24 Reception data demodulation unit
25 Transfer function estimation unit
26 Optical reception unit
27-1 to 27-4 ADC

The invention claimed is:

1. An optical transmission system comprising:
an optical transmitter; and
an optical receiver,
wherein the optical transmitter includes
a low speed signal generation unit configured to generate, based on an input signal of a transmission data sequence and a first signal obtained by cyclically shifting a spectrum of the input signal, a plurality of low speed signals,
a high speed signal generation unit configured to digital-to-analog convert and synthesize the plurality of low speed signals to generate a high speed signal, and
an optical modulation unit configured to transmit an optical signal obtained by modulation of the high speed signal to a transmission path, and
the optical receiver includes
a reception unit configured to receive the optical signal from the transmission path and output the high speed signal obtained from the optical signal that is received,
an optical-receiver-side high speed signal compensation unit configured to compensate, based on the high speed signal output by the reception unit and a second signal obtained by cyclically shifting a spectrum of the high speed signal, for the high speed signal, and
a reception data decoding unit configured to decode the high speed signal compensated by the optical-receiver-side high speed signal compensation unit to restore binary information included in the optical signal transmitted by the optical transmitter.

2. The optical transmission system according to claim 1, wherein
the optical transmitter further includes a transmitter-side high speed signal compensation unit configured to multiply a transfer function by each of the input signal of the transmission data sequence and the first signal obtained by cyclically shifting the spectrum of the input signal and add up multiplication results to compensate for the input signal,
the low speed signal generation unit generates the plurality of low speed signals from the input signal compensated by the transmitter-side high speed signal compensation unit, and
the optical-receiver-side high speed signal compensation unit multiplies a transfer function by each of the high speed signal output by the reception unit and the second signal obtained by cyclically shifting the spectrum of the high speed signal and adds up multiplication results to compensate for the high speed signal.

3. The optical transmission system according to claim 2, wherein
the optical receiver further includes a transfer function estimation unit configured to calculate the transfer function based on a difference between an output signal of the optical-receiver-side high speed signal compensation unit and a reference signal.

4. The optical transmission system according to claim 3, wherein
the transfer function estimation unit calculates the transfer function by using, as the reference signal, part of the transmission data sequence predefined as a known signal, or calculates the transfer function by using, as the reference signal, a value obtained by hard decision on the output of the optical-receiver-side high speed signal compensation unit.

5. The optical transmission system according to claim 1, wherein
the low speed signal generation unit multiplies a transfer function by each of the input signal of the transmission data sequence and the first signal obtained by cyclically shifting the spectrum of the input signal and adds up multiplication results to compensate for the input signal, and generates the plurality of low speed signals from the input signal that is compensated, and
the optical-receiver-side high speed signal compensation unit multiplies a transfer function by each of the high speed signal output by the reception unit and the second signal obtained by cyclically shifting the spectrum of the high speed signal and adds up multiplication results to compensate for the high speed signal.

6. An optical transmitter in an optical transmission system including the optical transmitter and an optical receiver, the optical transmitter comprising:
a low speed signal generation unit configured to generate, based on an input signal of a transmission data sequence and a signal obtained by cyclically shifting a spectrum of the input signal, a plurality of low speed signals,
a high speed signal generation unit configured to digital-to-analog convert and synthesize the plurality of low speed signals to generate a high speed signal, and
an optical modulation unit configured to transmit an optical signal obtained by modulation of the high speed signal to a transmission path.

7. A transfer function estimation method in an optical transmission system including an optical transmitter and an optical receiver, the transfer function estimation method comprising:
by the optical transmitter, generating, based on an input signal of a transmission data sequence and a first signal obtained by cyclically shifting a spectrum of the input signal, a plurality of low speed signals;
by the optical transmitter, digital-to-analog converting and synthesizing the plurality of low speed signals to generate a high speed signal;
by the optical transmitter, transmitting an optical signal obtained by modulation of the high speed signal to a transmission path;
by the optical receiver, receiving the optical signal from the transmission path and outputting the high speed signal obtained from the optical signal that is received;
by the optical receiver, compensating, based on the high speed signal that is output and a second signal obtained by cyclically shifting a spectrum of the high speed signal, for the high speed signal; and,
by the optical receiver, decoding the high speed signal that is compensated to restore binary information included in the optical signal transmitted by the optical transmitter.

* * * * *